United States Patent
Bastholm et al.

[11] Patent Number: 5,928,412
[45] Date of Patent: Jul. 27, 1999

[54] METHOD AND APPARATUS FOR CLEANING A VAPOUR

[75] Inventors: Jeppe Christian Bastholm, Soenderborg; Asger Gramkow, Augustenborg, both of Denmark

[73] Assignee: Agro Miljø A/S, Sønderborg, Denmark

[21] Appl. No.: 08/765,728

[22] PCT Filed: Jul. 19, 1995

[86] PCT No.: PCT/DK95/00310

§ 371 Date: Dec. 30, 1996

§ 102(e) Date: Dec. 30, 1996

[87] PCT Pub. No.: WO96/03191

PCT Pub. Date: Feb. 8, 1996

[30] Foreign Application Priority Data

Jul. 22, 1994 [DK] Denmark ................... 0868/94

[51] Int. Cl.⁶ ................................................. B01D 47/12
[52] U.S. Cl. ................................. 95/158; 95/173; 95/174; 95/223; 95/228; 95/210; 96/329; 96/331; 422/170
[58] Field of Search ................... 55/244, 234, 264; 95/281, 227, 223, 225, 158, 173, 174, 228; 422/168, 169, 170; 96/329, 351, 331

[56] References Cited

U.S. PATENT DOCUMENTS

| | | | |
|---|---|---|---|
| 4,248,609 | 2/1981 | Weber | 261/117 |
| 4,455,157 | 6/1984 | Honerkamp et al. | 55/234 |
| 4,533,522 | 8/1985 | Leimkuhler | 55/244 |
| 4,612,174 | 9/1986 | Fabian et al. | 95/223 |
| 4,853,002 | 8/1989 | Niedzwiecki et al. | 95/266 |
| 5,273,719 | 12/1993 | Kishi et al. | 422/122 |

FOREIGN PATENT DOCUMENTS

| | | | |
|---|---|---|---|
| 54-21958 | 2/1979 | Japan | 95/223 |
| 213240 | 5/1941 | Switzerland . | |

*Primary Examiner*—Jay H. Woo
*Assistant Examiner*—Robert Hopkins
*Attorney, Agent, or Firm*—Watson Cole Grindle Watson, P.L.L.C.

[57] ABSTRACT

A method is disclosed by which vapour is cleaned of gaseous impurities during evaporation of polluted liquids. Vapour is conducted via a boiler, a compressor to a heat exchanger (12) in which condensation takes place. In order to clean the vapour, a scrubber (14) is arranged between the boiler (3) and the heat exchanger (12), in which the vapour is scrubbed in several steps (17, 18) at different pH values. Thus, the step (17) is an acid step, whereas the step (18) is an alkaline step. In this manner, the vapour for condensation may be conducted into the heat exchanger and be condensed in order to remove a clean condensate without pollution of acid or alkaline substances.

7 Claims, 2 Drawing Sheets

METHOD AND APPARATUS FOR CLEANING A VAPOUR

BACKGROUND OF INVENTION

1. Field of the Invention

The present invention relates to a method for cleaning vapour of gaseous impurities by scrubbing the vapour in several steps at different pH values, preferably in at least one acid step and one alkaline step wherein the vapour is produced by preceding evaporation of polluted fluids, wherein polluted vapour is formed by boiling in a boiler, wherein the vapour is conducted to a compressor where it is compressed, and thereafter to a heat exchanger in which clean vapour is condensed and wherein the scrubbing of the vapour is performed between the boiler and the heat exchanger.

The invention also relates to an apparatus for accomplishing the method.

The method and the apparatus may be used for cleaning and separating polluted liquids during their evaporation. As examples of this one may mention industrial waste water, degreasing water, organic liquids such as manure, food production wastes etc.

2. The Prior Art

During evaporation of polluted liquids, there will most often be problems with forming the condensed vapour without impurities. This is due to the well-known phenomenon referred to as steam distillation. In the present application impurities refer to elements that are undesirable in the clean condensed liquid fraction, which is generally water. The impurities may, e.g., be alcohols, ammonia, acetic acid, etc.

During evaporation the vapour is conducted from the evaporation location, the boiler, via a compressor to the condensation location, a heat exchanger, in which the vapour is condensed. The vapour being conducted from the boiler to the heat exchanger will contain the same gases or vapours in gaseous form as those present in liquid form in the polluted liquid in the boiler.

The combination of impurities in the gas or the vapour will depend on the substances present in the polluted liquid being evaporated. Impurities in the gas will also depend on their being miscible, finitely miscible or non-miscible. Furthermore, the partial pressures of the various components at the evaporation temperature in question will also influence the composition of the impurities in the gas.

During the evaporation process there may also occur a change of substances in ion form so that these substances are converted into gaseous form and as such appear as pollutions of the gas. Most of the substances in these polluted gases may be reconstituted in ion form in a condensate if the conditions of pressure and temperature are attuned.

Thus, during evaporation of polluted liquids there will often be problems with forming the condensed vapour without impurities. This phenomenon is also referred to as steam distillation.

A number of different principles are known for using scrubbers to clean a polluted gas of undesirable gaseous pollutions. This is known, e.g., from the disclosures of FR 2,666,330. These methods are based on conducting the polluted gas through a liquid absorbing as much as possible of the polluted gas in liquid or ion form. It is important to use liquid with acid addition if the polluted gas has an alkaline reaction and, contrarily, with alkaline addition if the polluted gas has an acid reaction. In this process it is necessary to remove steam from the gas before scrubbing is performed.

Thus, several steps may be used if both acid and alkaline substances are present in the polluted gas. In this principle, atmospheric air is used as a carrier gas for the polluted gas.

From the disclosure of CH 213,240 A a method as mentioned by way of introduction is known. Thus, it is known to produce vapour by evaporation of polluted fluids. The vapour is formed in a boiler and thereafter it is condensed in a heat exchanger. A cleaning of the vapour is performed between the boiler and the heat exchanger. In order to clean the vapour a chemical solution is introduced into a chemical apparatus in order to react with the impurities in the vapour. It is disclosed that cleaning could be effected in two steps as it is disclosed that the vapour, after passage through said chemical apparatus, is led through a washing column.

The dissolved impurities are removed from the chemical apparatus. It is not disclosed that the chemical reaction could be an acid step and an alkaline step. However, it is disclosed that an ordinary scrubbing is effected in combination with a chemical reaction in order to bind the impurities by absorption or through a chemical bond. The process would involve several means for controlling the cleaning, the admixing of chemical solution and for removing the dissolved impurities.

It is the object of the present invention to remedy disadvantages of the prior art methods and apparatuses.

SUMMARY OF THE INVENTION

In order to obtain this, the method according to the present invention is characterized in that the scrubbing is performed in a scrubbing media with a basic fluid corresponding to the condensate and at the boiling point temperature of the fluid and that the scrubbing is performed in a thermally insulated cabinet in which the other evaporation steps are also performed.

The apparatus of the invention is designed for cleaning vapour of gaseous impurities by the method and by use of a scrubber having several steps that include scrubbing media with different pH values, preferably at least one acid and one alkaline step, said cleaning being performed during evaporation of polluted liquids, said apparatus including a boiler in which the vapour is formed by boiling the polluted liquid, a compressor for compressing the vapour, and a heat exchanger in which clean vapour is condensed, and said scrubber is arranged in a conduit between the boiler and the heat exchanger characterized in that the scrubber contains a scrubbing media with a basic fluid corresponding to the condensate and that it is located in a thermally insulated cabinet which also contains the other apparatus parts for use in the evaporation.

As the vapour formed during evaporation is conducted through two adjacent liquid steps in a position between boiling and condensation, and when operating at the boiling point temperature, it is possible to form a mechanically simple scrubber that will remove the gaseous impurities from the vapour for condensation. Thus, the gas, which is clean after the scrubber, may be conducted into the heat exchanger and be condensed so that the condensate is clean without contents of acid or alkaline substances. In the scrubber, a balance of the liquid level of each scrubbing step is established automatically, and there is no need for preceding cleaning of the vapour before it is let into the scrubber. It could be said that the invention discloses a new technique being a combination of a traditional scrubber and a traditional column.

As the scrubbing is performed in an insulated cabinet in which boiling and condensation also take place so that the entire system is energy neutral as there is no interaction with the surroundings. Thus, the same amount of steam or gas will evaporate, respectively condensate, during the entire process.

The method of the apparatus according to the invention is particularly suitable for use in evaporation of pig manure, in which polluted gases are present in the shape of ammonium and acetates. By the mentioned step operating at different pH values, these substances may be retained so that the condensate appears as clean, reusable water. The method will not just be suitable for manure but also for other polluted liquids such as freons, cutting oils, etc., in which impurities are present that may be cleaned out of the gas by a method known per se in a scrubber having alkaline and acid reaction.

If vapour is cleaned during the evaporation of manure, only two steps will be required, but it is possible to use several steps having different pH values. Thereby it is possible to obtain savings in the consumption substances used. During evaporation, the pH is kept relatively constant in order to maintain the same efficiency in cleaning.

The invention will now be explained with reference to the accompanying drawings.

DETAILED DESCRIPTION OF THE PREFERRED EMBODIMENT

Figure 1:
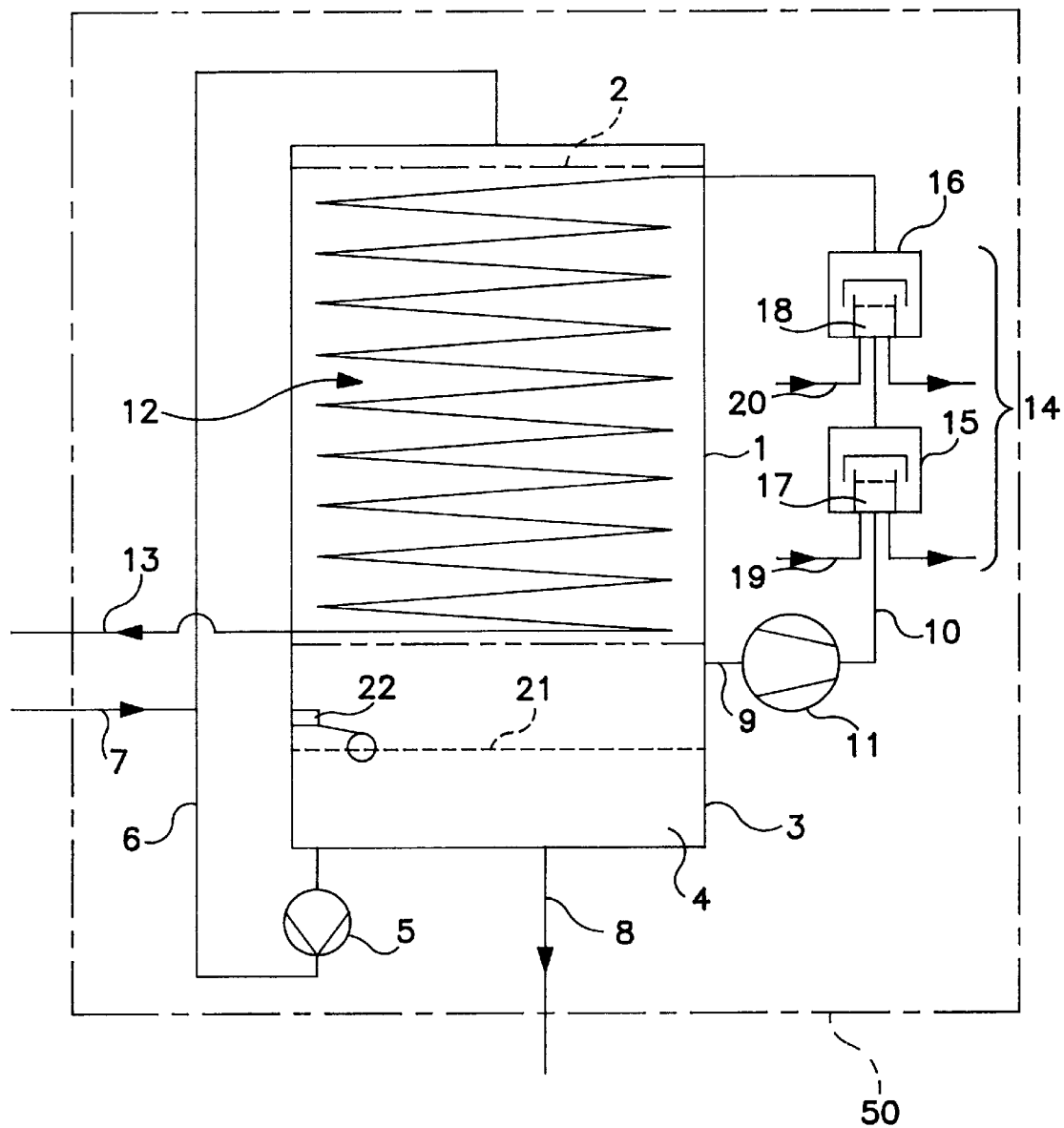
FIG. 1 shows a schematic plant with an apparatus according to the invention, said apparatus being particularly suited for evaporation of pig manure.

FIG. 1 illustrates schematically a plant with an apparatus according to the invention. The plant is constructed for separation of polluted liquids by mechanical vapour compression. Thus, the plant is run according to a known principle for separating a polluted liquid part, preferably water, and concentrate the polluted part. The primary liquid part to be cleaned may consist of water but may also consist of other liquids such as freon polluted by oil.

The plant comprises an evaporator 1. At the top of the evaporator, a distributor system 2 is arranged, and at the bottom a vessel 3 containing the polluted liquid 4 is arranged. The vessel 3 is connected with a circulation pump 5 and a conduit 6 pumping the heated and polluted liquid 4 to the distributor system 2 in the evaporator top. The vessel 3 has an inlet 7 for feeding polluted liquid 4, and a discharge conduit 8 used for emptying the concentrated and polluted part out of the boiler 3.

At the top of the boiler 3 is a vapour outlet 9, which is connected via a conduit 10 and a compressor 11 to a heat exchanger 12 positioned in the evaporator 1. In the bottom of the heat exchanger 12 is an outlet 13 for condensate. A scrubber 14 is inserted in the conduit 10, where the compressor 11 is mounted, too. In the situation shown, the scrubber 14 is located upstream of the compressor 11. This is preferred, but it is also possible to position the scrubber 14 downstream of the compressor 11.

It should be noted that no construction of electric control of the plant is illustrated in the drawing. However, such a control system will be well-known to a person skilled in the art and, therefore, requires no detailed explanation.

Thus, the polluted liquid 4 is added in portions at the inlet 7 and let out via the discharge conduit 8 after a concentration has taken place. The condensate or distillate is removed via the outlet 13.

When the polluted liquid has been introduced into the vessel 3, the illustrated level 21 is obtained. This causes a level switch 22 to shift so that a heating member (not shown) and the circulation pump 5 are turned on. Thereafter, the temperature is brought to a temperature and pressure state lying immediately below the boiling point of the liquid to be cleaned (the condensate). Thus, in the case of water, the temperature is brought to nearly 100° C.

The circulation pump 5 is turned on when starting the plant in order to ensure that all components have the same temperature. When the temperature has reached approximately 100° C., the compressor 11 is turned on. The compressor 11 creates a low pressure in the vessel 3, thus forcing the vapour present over the polluted liquid 4 through the scrubber 14, whereupon vapour is conducted via the conduit 10 to the compressor 11 and then into the heat exchanger 12, where there is a heat exchange of the vapour on one side of the heat exchanger and the heated polluted liquid 4 on the other side of the heat exchanger. This will cause the vapour having been compressed in the compressor 11 to deliver its energy, which is transferred to the circulated polluted liquid 4 on the other side of the heat exchanger. This will make the liquid to be cleaned evaporate. This vapour travels through the heat exchanger 12 via its first side and thus flows into the top of the vessel 3 and will flow via the vapour outlet 9 and through the scrubber 14, the con-duit 10 and the compressor 11 into the heat exchanger 12. While delivering its energy, the vapour is condensed and may subsequently be removed as condensate via the outlet 13.

The scrubber 14 comprises a first and a second scrubber 15, 16. The scrubber 15 con-tains an acid 17, and the scrubber 16 contains a base 18. Either scrubber 15, 16 is provided with an inlet line 19, 20 for feeding acid and base, respectively. Thus, it is possible on the basis of measurements to replace liquids 17, 18 so the pH is kept substantially constant during evaporation. The scrubber 14 will preferably be arranged with the acid step 15 upstream of the alkaline step 16. This order is important as the acids are more volatile than the bases. In order to retain what remains in the latter step of the scrubber 14, this must be a base, e.g. sodium hydroxide.

The entire system is contained within a closed and insulated cabinet 50. In this manner an energy-neutral process is obtained as there is no interaction with the surroundings. Advantageously, this will also mean that the vapour is prevented from undesirable condensing in a step having a lower temperature. If there were "cold steps", the process would come to a halt as the vapour would just condense in such a cold step in stead of the desired condensing in the heat exchanger 12.

The scrubbers 15, 16 are provided with fillers 23 for damping the formation of bubbles, splashing and the like, which gives rise to sprays of liquid and thus the risk of drops being thrown out into the vapour conduit 10. These fillers will preferably be stones. In this manner it will be possible to prevent too violent dashing of liquid as the vapour bubbles up through the liquids 17, 18 in the scrubbers 15, 16.

The scrubber 14 will now be described more specifically with reference to FIG. 2.

Figure 2:
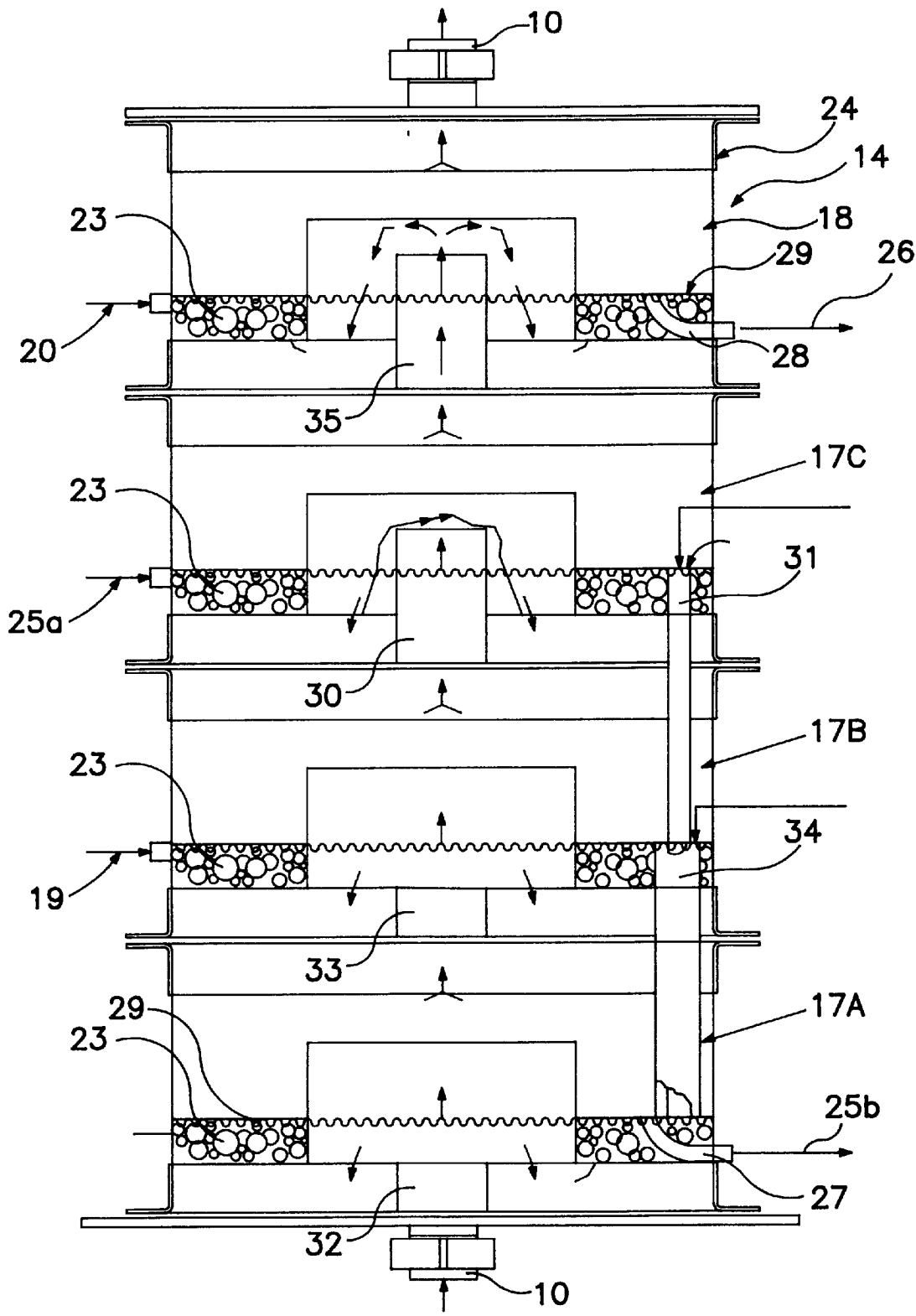
FIG. 2 shows a-specific embodiment of the apparatus according to the invention.

FIG. 2 shows an embodiment of a scrubber 14 being provided with more than two steps. Thus, the scrubber comprises three acid steps 17A, 17B and 17C. The scrubber further comprises an acid (should read "alkaline", confer e.g. line 23. Translator's note) step 18. The scrubber 14 has a substantially cylindrical shape with conduits etc. positioned within a cylindrical sleeve 24. The scrubber is connected with an inlet for acid 19, an inlet 25a for water formed in the apparatus, and an inlet 20 for base. The scrubber comprises an outlet 25b for used acid and an outlet 26 for used base. The outlet is connected with overflow pipes 27, 28, respectively, and the outlet takes place when a liquid surface 29 reaches an upper end of the outlet pipes 27, 28.

In the acid step 17C gases bubble up through a central stub 30 and are forced down through the liquid contained therein, which consists of water that is acidified very slightly due to the volatile character of acid. Thus, these volatile acids form an acid solution, which runs via an overflow pipe 31 down into the first step 17A in order to -obtain an initial cleaning of the gas flowing into the first step, a stub 32. In the second step 17B, in which acid is added via the inlet 19, the gas enters via a stub 33. After passage in the liquid contained therein, there may still, as mentioned above, appear certain acid remnants which are caught in the subsequent step 17C. The liquid in the acid step 17B is let via an overflow 34 into the first step 17A with the liquid from the overflow pipe 31. Thus, all acid liquid ends up in the first step 17A, where it is removed via the outlet 25. After the gas has passed through the acid steps 17A–17B, it is let via a stub 35 into the alkaline step 18. Here the gas bubbles out through the liquid and then leaves the scrubber 14 through the conduit 10.

In this structure several acid steps are used. This will often be the case as the acids are more volatile than the base. As several steps are used, it will be possible to adjust the consumption of acid more precisely and thus reduce the total acid consumption in the scrubber 14. It will generally be sufficient to use one alkaline step 18 as the vapour will appear without alkaline impurities after passage through it.

As an example of a size of a scrubber 14, it will have a diameter of approximately 0.60μm and a height of approximately 1.20 for a capacity for cleaning gas from a manure production of 500l/h.

We claim:

1. A method for recovering a purified basic fluid from a polluted liquid comprising said basic fluid which comprises the steps of (a) heating said polluted liquid to a boiling temperature of said basic fluid to produce a vapor of said basic fluid containing gaseous impurities, (b) compressing said vapor containing gaseous impurities, (c) scrubbing said vapor containing gaseous impurities with a first scrubbing media containing said basic fluid at said boiling temperature, (d) scrubbing said vapor containing gaseous impurities with a second scrubbing media containing said basic fluid at said boiling temperature, said first and second scrubbing media having differing pH values, and (e) subsequently condensing said vapor to recover purified basic fluid, said basic fluid being maintained at said boiling temperature by insulating steps (a)–(e).

2. A method according to claim 1, wherein said first scrubbing media has an acidic pH and said second scrubbing media has a basic pH.

3. A method according to claim 1, wherein said basic fluid is water.

4. An apparatus for boiling polluted liquid comprising a basic fluid to obtain a vapor of said basic fluid containing gaseous impurities and for scrubbing said vapor containing gaseous impurities to provide a purified liquid condensate of said basic fluid, said apparatus comprising:

an insulated housing, a boiler means in said insulated housing for boiling said polluted liquid containing a basic fluid and providing a vapor of said basic fluid containing gaseous impurities, heat exchanger means in said insulated housing for cooling purified vapor of said basic fluid and providing said purified liquid condensate, conduit means in said insulated housing for connecting said boiler means with said heat exchanger means, a compressor connected in said conduit means for compressing vapor therein, and a scrubbing means connected in said conduit means for removing gaseous impurities from said vapor and for providing purified vapor, said scrubbing means including a first scrubbing stage for passing said vapor containing gaseous impurities through a first scrubbing media containing said basic fluid and a second scrubbing stage for passing said vapor containing gaseous impurities through a second scrubbing media containing said basic fluid, said first and second scrubbing media having different pH values, said insulated housing maintaining the temperature of said boiler means, said heat exchanger means, said conduit means, said compressor and said scrubbing means at the boiling temperature of said basic fluid.

5. An apparatus according to claim 4, wherein said compressor is connected in said conduit means between said boiler means and said scrubbing means.

6. An apparatus according to claim 4, including means to supply a pH-adjusting agent to each of said first and second scrubbing stage.

7. An apparatus according to claims 4, wherein each of said first and second scrubbing stages includes foam damping members.

* * * * *